(12) United States Patent
Arminak

(10) Patent No.: US 10,335,816 B1
(45) Date of Patent: Jul. 2, 2019

(54) ALL PLASTIC WATER RESISTANT PUMP

(71) Applicant: Armin Arminak, Pasadena, CA (US)

(72) Inventor: Armin Arminak, Pasadena, CA (US)

(*) Notice: Subject to any disclaimer, the term of this patent is extended or adjusted under 35 U.S.C. 154(b) by 0 days.

(21) Appl. No.: 16/225,842

(22) Filed: Dec. 19, 2018

Related U.S. Application Data

(60) Provisional application No. 62/724,491, filed on Aug. 29, 2018.

(51) Int. Cl.
*B05B 11/00* (2006.01)
*F04B 9/14* (2006.01)
*F16K 15/04* (2006.01)

(52) U.S. Cl.
CPC ...... *B05B 11/3077* (2013.01); *B05B 11/3025* (2013.01); *F04B 9/14* (2013.01); *F16K 15/044* (2013.01); *F16K 15/048* (2013.01)

(58) Field of Classification Search
CPC .... B05B 11/3077; B05B 11/3025; F04B 9/14; F16K 15/044; F16K 15/048
See application file for complete search history.

(56) References Cited

U.S. PATENT DOCUMENTS

| | | |
|---|---|---|
| 3,006,282 A | 10/1961 | Sisson |
| 3,124,060 A | 3/1964 | Sisson |
| 3,664,556 A | 5/1972 | Perry |
| 4,065,038 A | 12/1977 | Magers |
| 4,763,818 A | 8/1988 | Stefano |
| 5,165,577 A | 11/1992 | Ophardt |
| 5,282,552 A | 2/1994 | Ophardt |
| 5,363,993 A * | 11/1994 | Mascitelli ........... B05B 11/0013 222/153.09 |
| 5,462,208 A * | 10/1995 | Stahley ................. B05B 7/0037 222/190 |
| 5,620,314 A | 4/1997 | Worton |
| 5,673,824 A | 10/1997 | Evans |
| 5,676,277 A | 10/1997 | Ophardt |
| 5,924,603 A | 7/1999 | Santagiuliana |
| 6,695,176 B1 * | 2/2004 | Nazari .................. B05B 11/007 222/321.9 |
| 7,717,301 B2 * | 5/2010 | Tsai ..................... B05B 11/3087 222/190 |
| 7,850,048 B2 * | 12/2010 | Arminak ............. B05B 11/3047 222/190 |
| 8,297,475 B2 * | 10/2012 | Limbert .............. B05B 11/3087 222/153.07 |
| 2005/0081891 A1 | 4/2005 | Arjomand |

\* cited by examiner

*Primary Examiner* — Frederick C Nicolas
(74) *Attorney, Agent, or Firm* — Cislo & Thomas, LLP

(57) ABSTRACT

A water resistant hand pump fabricated entirely from plastic components is provided. The pump comprises a pump housing, actuator, piston, chaplet, stem and a pump spring where the pump spring is in the form of an elastic dome made from an elastomeric polymer. The all plastic hand pump is suitable for dispensing liquids and creams from a dispenser bottle. Used pumps do not require disassembly to be recycled.

20 Claims, 10 Drawing Sheets

ALL PLASTIC WATER RESISTANT PUMP

CROSS-REFERENCES TO RELATED APPLICATION

This application claims the benefit of U.S. Provisional Application Ser. No. 62/724,491, filed Aug. 29, 2018 and entitled "All Plastic Hand Pump," which is incorporated here by this reference.

BACKGROUND OF THE INVENTION

Field of the Invention

This invention relates to liquid dispensing pumps for dispensing fluids and, in particular, to a hand operated dispensing pump made from all plastic components.

Background Art

Hand operated dispensing pumps are well known in the personal care industry for dispensing fluid products such as liquids and creams. The majority of hand pumps presently available are made from plastic but include at least a metal compression spring to return the pump actuator to its starting position after being depressed. Typically, hand operated dispensing pumps are pre-installed on a fluid filled container prior to sale and are disposed of along with the container when the contents of the container are depleted. The pumps are not typically intended to be reused. Although pumps using metal return springs operate effectively, and are of relatively low cost to make, they have certain drawbacks. In particular, the steel compression springs typically used in such pumps may cause rust contamination of the product to be dispensed. The vents of prior art hand pumps are typically located at or about the chaplet, a location frequently splashed with water, and thereby may lead to water contamination of the product to be dispensed. In addition, due to their containing metal components, prior art hand pumps are difficult to recycle.

Plastic parts are recycled by grinding or shredding the parts. The shredded material may then be reused, typically by melting the material and mixing it with new plastic. To be suitable for grinding or shredding, used plastic must be free of any metal parts. A hand pump using a metal return spring, or any metal components, must be disassembled to remove the metal components prior to recycling the plastic materials which compose the bulk of the pump. The need to disassemble a used hand pump to remove the metal components prior to recycling increases costs and has the effect of decreasing the desirability of used hand pumps as a source of recycled plastic. Thus, there is a need in the art for a hand pump made from all plastic components. Such pumps would require no disassembly prior to being ground or shredded for use as recycled plastic.

SUMMARY OF THE INVENTION

The present invention meets a long-felt need in the art by providing a new hand pump design that is fabricated entirely from plastic materials. The all plastic hand pump of the present invention eliminates potential contamination of the product to be dispensed due to rusting of the steel compression springs typically found in prior art hand pumps and is easy to recycle. The all plastic pump also incorporates a new vent configuration locating the pump vents just below the actuator. This new design offers a substantial increase in the degree of water resistance in comparison to conventional hand pumps which typically locate the vents at the chaplet. The vent design of the present invention reduces the likelihood of water contamination of the product to be dispensed.

The major components of the pump comprise a pump body having a hollow interior, wherein the hollow interior is in the form of a cylindrical bore, a chaplet disposed in an upper end of the pump body, a hollow stem having an upper end and a lower end. The stem is partially disposed inside the interior of the pump body and is supported by a bore formed in the chaplet. The hand pump also includes an actuator having a nozzle, wherein the actuator has a central passage having upper and lower ends. The upper end of the central passage of the actuator is in fluid communication with the nozzle and the lower end of the central passage is in fluid communication with the upper end of the hollow stem. The lower end of the hollow stem is in selective fluid communication with the interior of the pump body.

The hand pump further includes a piston which is configured to slidably attach to the bottom of the stem and is constrained by a sub-stem such that on a down-stroke of the pump, the piston moves upwardly along the stem sufficient to allow fluid to enter the hollow stem, and on an upstroke, the piston moves downwardly and seals against the sub-stem and thereby prevents fluid from entering into the hollow stein. An outside diameter of the piston is in a slip fit relationship with the interior bore of the pump body. Disposed between the actuator and the chaplet is an elastic dome spring which acts as a compression spring.

A lower end of the pump body is configured to accept a ball style check valve. A dip tube is disposed in a bore at the lower end of the pump body and is in selective fluid communication via the check ball with the hollow interior of the pump body and a container containing a fluid or cream to be dispensed.

The all plastic hand pump of the present invention operates as follows: (1) On the first down stroke, the piston lifts off the sub-stem, sliding upwardly on the stem, and thereby allows air to enter the stem and escape through the nozzle, as the actuator is depressed. Simultaneously, the check ball valve closes preventing fluid from entering the pump body. (2) On the first up stroke, the piston slides downwardly, relative to the stem, and seals against the sub-stem preventing fluid from entering the stem, and simultaneously, the ball check valve opens creating suction that pulls fluid into the pump body. (3) On the second down stroke the piston again lifts off the sub-stem allowing fluid to enter the stein, while simultaneously the ball check valve closes, causing fluid in the pump body to be forced into the stem and out the nozzle. (4) On the second up stroke, the piston again slides downwardly, relative to the stem and seals against the sub-stem thereby preventing fluid from entering the stem, while simultaneously, the ball check valve opens and a new charge of fluid is drawn into the pump body.

The functions of steps (3) and (4) repeat each time the actuator is subsequently depressed. During all operations, the elastic dome spring of the pump acts as a compression spring and provides the force necessary to drive the piston upwardly on the upstroke.

The above and other advantages of the all plastic hand pump of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

DESCRIPTION OF THE COMPONENT PARTS

Figure 1:
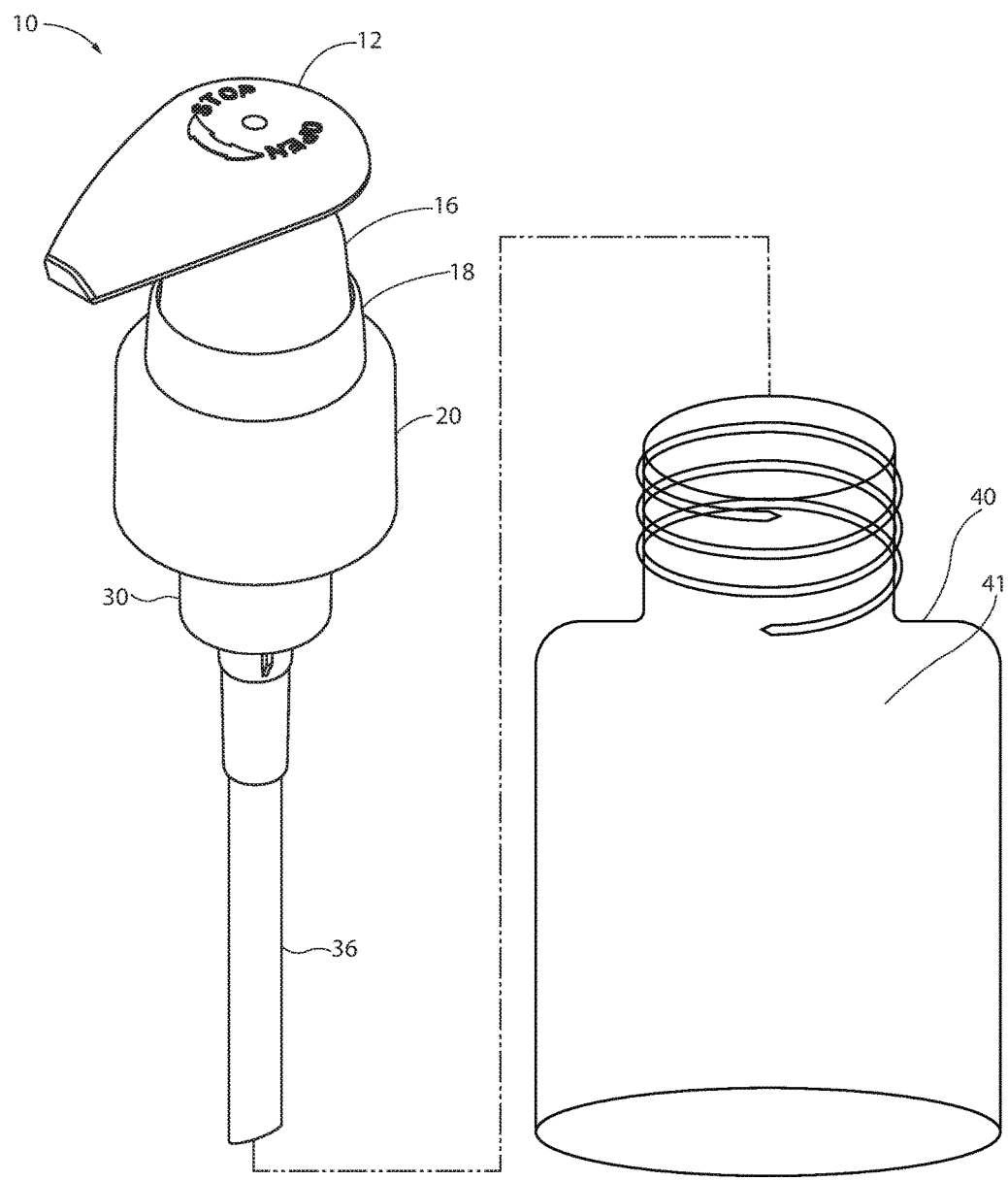
FIG. 1 is a perspective view of a hand pump in accordance with the present invention.
Figure 2:
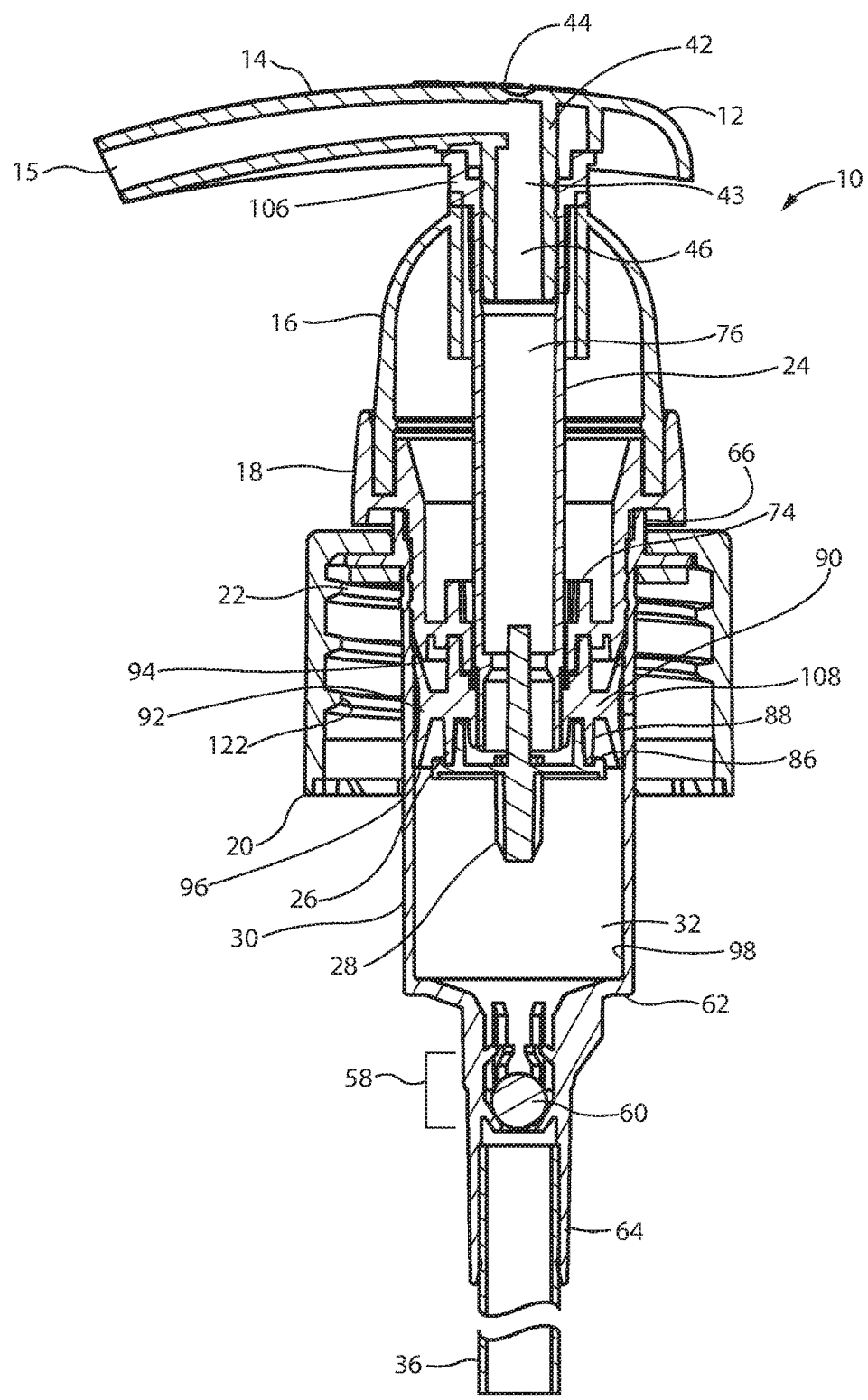
FIG. 2 is a cross-sectional view of the hand pump of FIG. 1, showing the pump's actuator in its normal or fully extended position.
Figure 3:
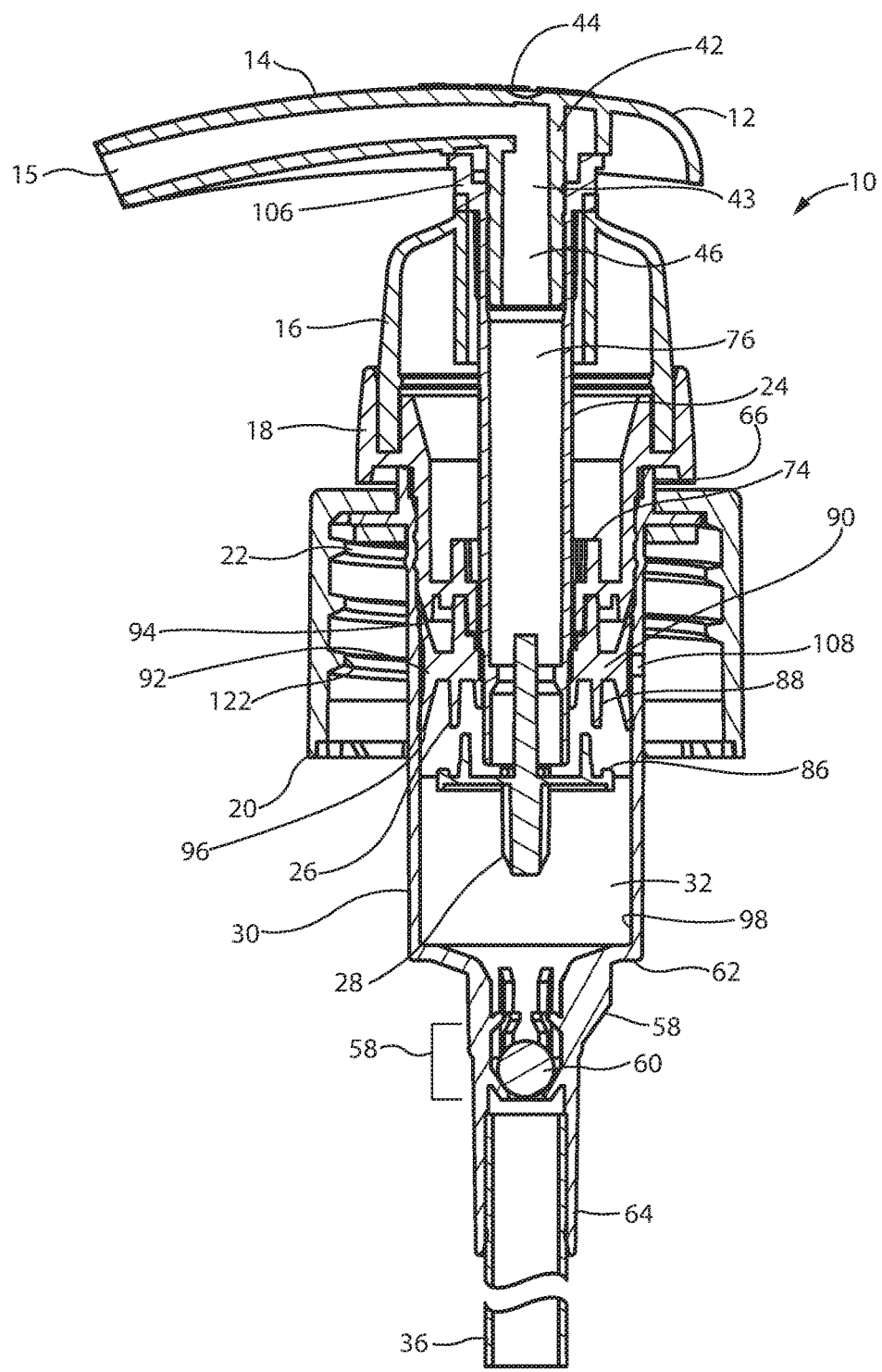
FIG. 3 is a cross-sectional view of the hand pump of FIG. 1, showing the pump with the actuator on a down-stroke, i.e. in a partially depressed position.
Figure 4:
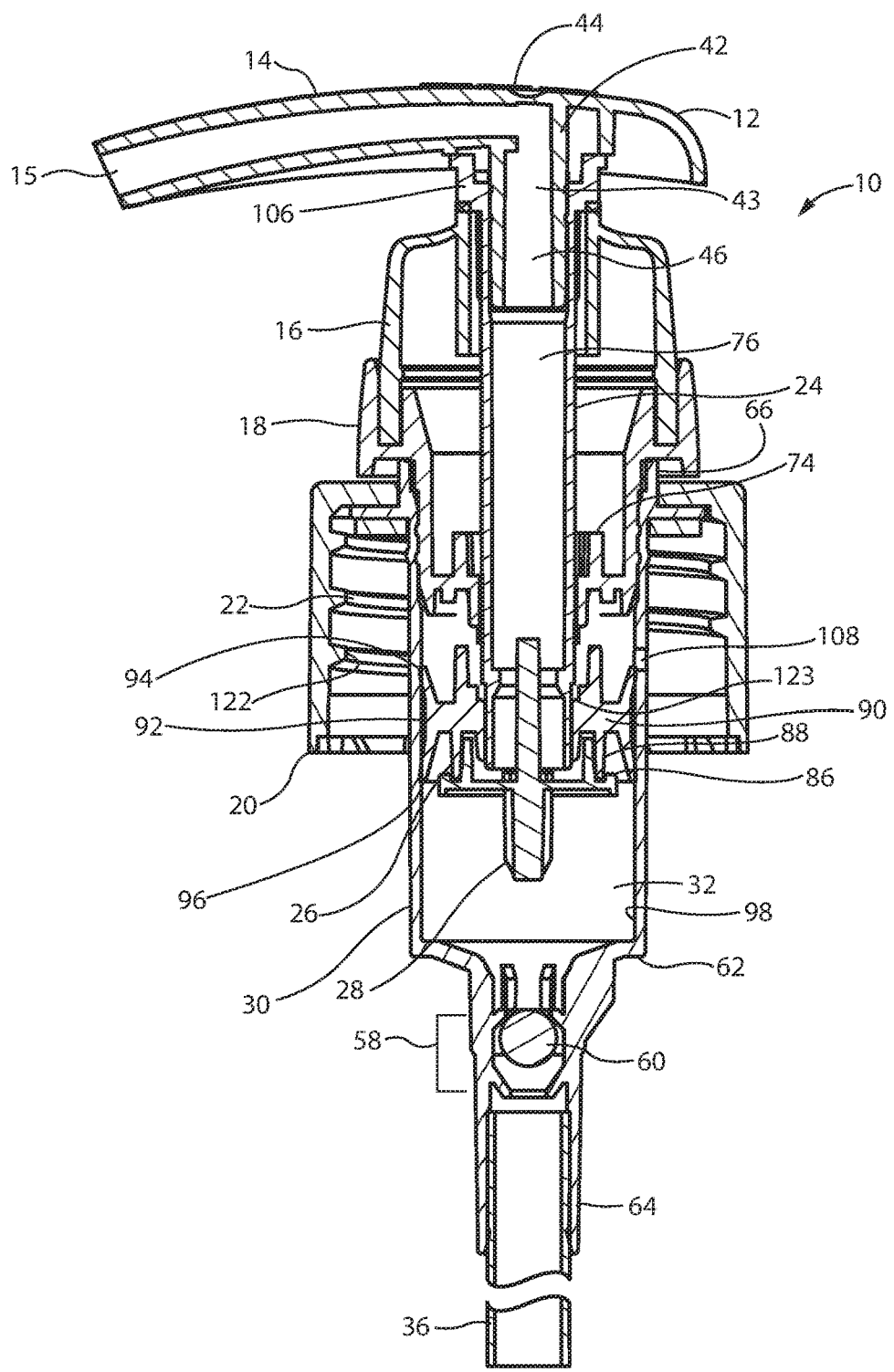
FIG. 4 is a cross-sectional view of the hand pump of FIG. 1, showing the pump with the actuator on an upstroke.
Figure 5:
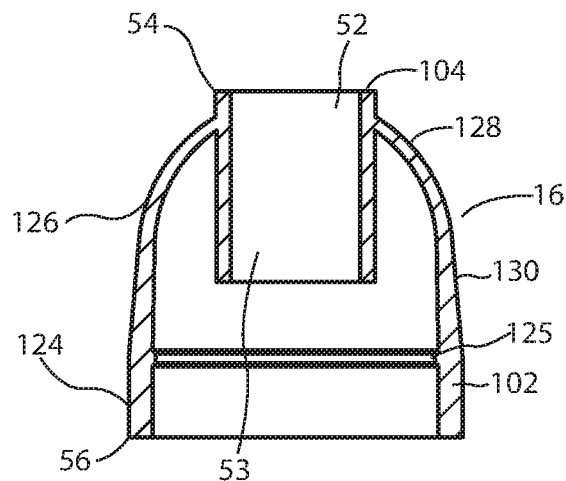
FIG. 5 is a cross-sectional view of the elastic spring of the hand pump of FIG. 1.
Figure 6:
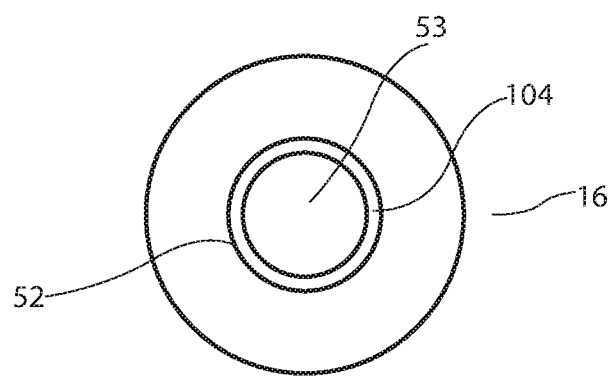
FIG. 6 is a top-plan view of the elastic spring of the hand pump of FIG. 1.
Figure 7:
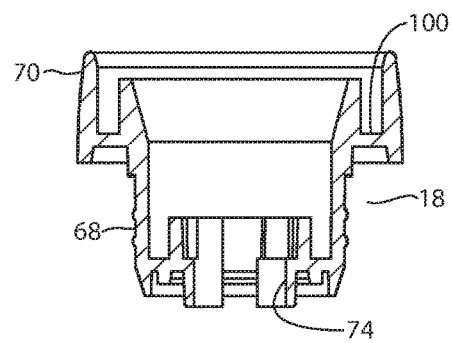
FIG. 7 is a cross-sectional view of the chaplet of the hand pump of FIG. 1.
Figure 8:
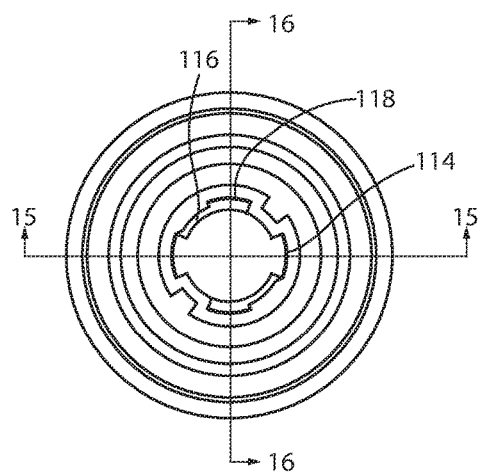
FIG. 8 is a top plan view of the chaplet of the hand pump of FIG. 1.
Figure 9:
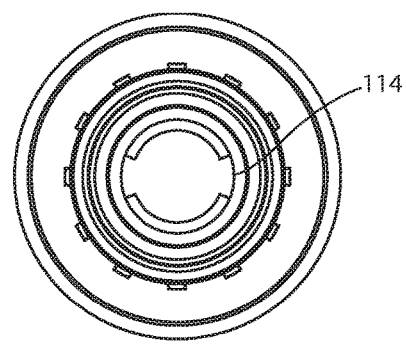
FIG. 9 is a bottom plan view of the chaplet of the hand pump of FIG. 1.
Figure 10:
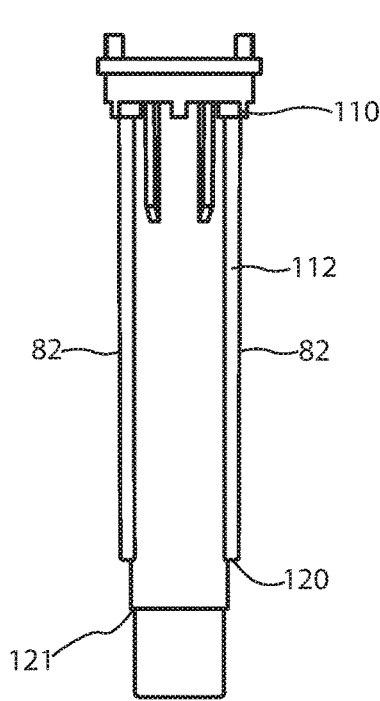
FIG. 10 is a front view of the stem of the hand pump of FIG. 1.
Figure 11:
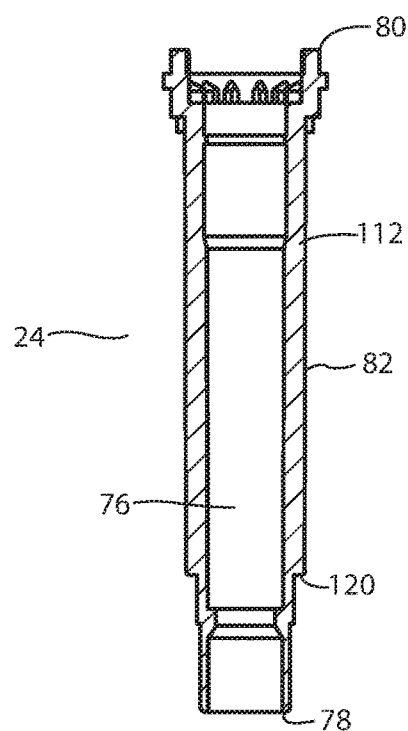
FIG. 11 is a cross-sectional view of the stem of the hand pump of FIG. 1.
Figure 12:
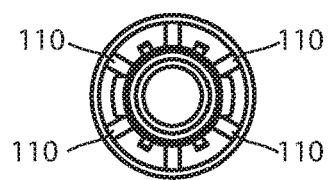
FIG. 12 is a bottom view of the stem of the hand pump of FIG. 1.
Figure 13:
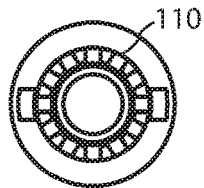
FIG. 13 is a top view of the stem of the hand pump of FIG. 1.
Figure 14:
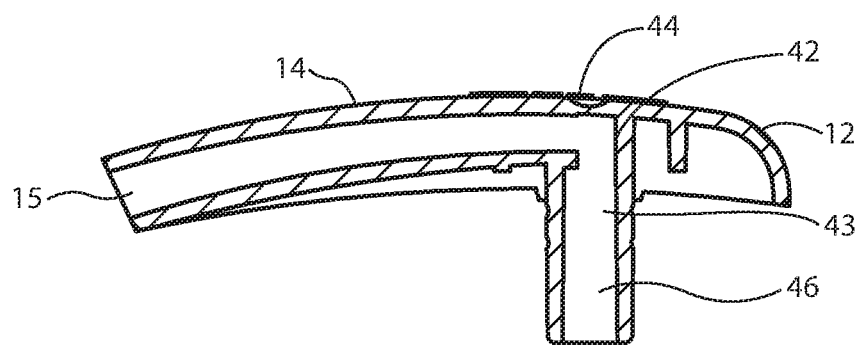
FIG. 14 is a cross-sectional view of the actuator of the hand pump of FIG. 1.
Figure 15:
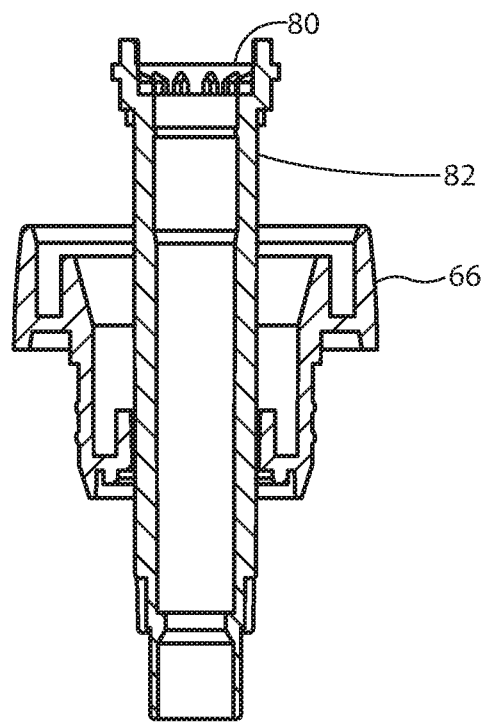
FIG. 15 is a cross-sectional view of the stem and chaplet of the hand pump of the present invention showing the stem disposed within the chaplet in an unlocked position. The view corresponds to a sectional view taken along the line 15-15 of the chaplet of FIG. 8.
Figure 16:
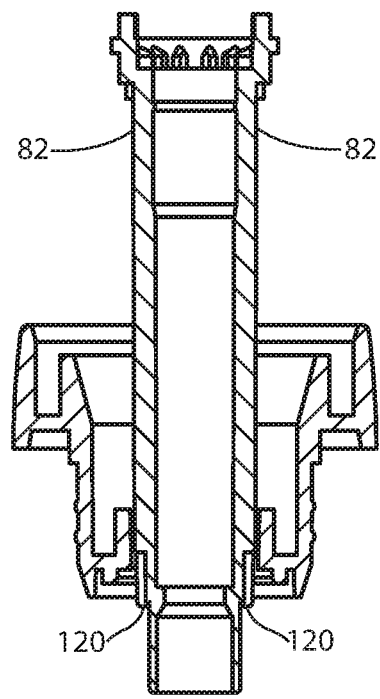
FIG. 16 is a cross-sectional view of the stem and chaplet of the hand pump of the present invention showing the stem disposed within the chaplet in a locked position. The view corresponds to a sectional view taken along the line 16-16 of the chaplet of FIG. 8.

Referring to FIGS. 1-16 the hand pump 10 of the present invention comprises an actuator 12, an elastic dome spring 16, a chaplet 18, a closure 20, a hollow stem 24, a piston 26, a sub-stem 28, a pump body 30, and a check valve 58. Typically, the hand pump 10 will also include a dip tube 36, where the dip tube 36 is in fluid communication with an interior volume 41 of a dispenser container 40.

The pump body 30 is a generally hollow, cylindrical body having an interior volume 32. The pump body is open at an upper end 66. The pump body 30 includes at least one vent 108, which vents the interior volume 41 of dispenser container 40 to atmosphere at certain times during the operating cycle of the hand pump 10. Formed integrally, at a lower end 62 of the pump body 30 is a check valve 58 which captively holds a check ball 60. Extending below the check valve 58 is a tube portion 64 which is configured to receive an end of the dip tube 36.

Referring now to FIGS. 1-4 and 7-9, disposed within the open upper end 66 of the pump body 30 is the chaplet 18. The chaplet 18 includes a generally cylindrical body portion 68 having a lip portion 70. The chaplet 18 is configured to fit within the pump body 30 with the lip portion 70 of the chaplet abutting the upper end 66 of the pump body 30. The chaplet further includes a hollow, cylindrical portion 74 which functions to slidably receive the stem 24.

Referring now to FIGS. 1-13, the stem 24 has a tubular body 82 having an open upper end 80 and an open lower end 78 and an interior flow passage 76. The stem 24 includes at least one air vent 110 at its upper end 80, where the at least one air vent 110 vents the portion of the pump body volume 32 above the level of the piston 26 to atmosphere. That is, the vent 110 allows air to pass through the gap between the stem 24 and the elastic dome spring 16 and exit or enter to the atmosphere. The stein 24 is slidably disposed through an upper opening 54 of the elastic spring 16 and the hollow cylindrical portion 74 of the chaplet and extends into the interior of the pump body 30. The lower end 78 of the stem 24 is configured to slidably receive the piston 26. Connected to the stem 24 and suspended just below the piston 26 is the sub-stem 28. The sub-stem 28 has a circular sealing surface 86 that selectively engages with a circular sealing rim 88 of the piston 26.

The stein 24, piston 26 and sub-stem 28 are configured such that on a down-stroke of the pump 10, the piston 26 slides upwardly a predetermined distance on the stem 24 such that the circular sealing rim 88 of the piston 26 lifts off the circular sealing surface 86 of the sub-stem 28. This upwards movement of the piston 26 relative to the stem 24 and sub-stem 28 allows air or fluid to be dispensed contained in the interior volume 32 of the pump body 30 to enter into the interior flow passage 76 of the stem 24.

Similarly, on an upstroke of the pump 10, piston 26 slides downwardly a predetermined distance on the stem 24 such that the circular sealing rim 88 of the piston 26 seals against the circular sealing surface 86 of the sub-stein 28. This downwards movement of the piston 26 relative to the stem 24 and sub-stem 28 prevents fluid to be dispensed contained in the interior volume 32 of the pump body 30 from entering into the interior flow passage 76 of the stem 24.

The piston 26 further includes an exterior flange 90 having an upper sealing edge 94 and a lower sealing edge 96 with a generally concave wall 92 therebetween. The upper and lower sealing edges 92 and 94, seal against an interior wall 98 of the hollow, cylindrical pump body 30. The sealing of the piston 26 against the interior wall 98 of the pump body 30 allows the piston to create pressure in the interior volume of the pump body 30, below the piston, on a down-stroke and suction on an upstroke. On a down-stroke, the piston seals against a step 121 formed on the stem 24 (see FIG. 10) to prevent liquid from entering into the portion of the interior volume 32 of the pump body 30 above the level of the piston 26.

Referring now to FIGS. 1-4, 13 and 15, the actuator 12 includes an integrally formed nozzle 14, having a flow passage 15, and an integrally formed tubular portion 42. The tubular portion 42 has an upper end 44 and a lower end 46 and an interior flow passage 43. The lower end 46 of the tubular portion 42 of the actuator 12 is disposed within the upper end 80 (see FIG. 15) of the stem 24.

Referring now to FIGS. 1-16, the flow passages of the hand pump 10 are configured as follows: The flow passage 15 of the nozzle 14 is in fluid communication with the flow passage 43 of the tubular portion 42 of the actuator 12. The flow passage 43 of the tubular portion 42 of the actuator 12 is in fluid communication with the flow passage 76 of the stem 24. The flow passage 76 of stem 24, in turn, is in fluid communication with the interior volume 32 of the pump body 30, which, via the dip tube 36, is in fluid communication with the contents of dispenser container 40.

Referring to FIGS. 1-6, in the exemplary embodiment, the elastic dome spring 16 has a generally, dome-shaped upper portion 126 with the upper opening 54 and having a generally cylindrical or tapered cylindrical lower portion 124 with a lower opening 56. The upper and lower portions 126 and 124 of the elastic dome spring 16 are separated by an internal ring 125, which is integrally formed in the elastic dome spring 16. The lower portion 124 has a generally uniform wall thickness 102, whereas the upper portion 126 has a wall thickness 130 that tapers towards the upper opening 54. The tapered wall thickness 128 serves to ensure that bending of the elastic dome spring 16 during a down-stroke of the actuator principally occurs the dome-shaped portion.

Extending downwardly from the upper opening 54 into the interior of the dome is a hollow, cylindrical portion 52, having an interior passage 53. The hand pump 10 is configured such that the elastic dome spring 16 is disposed between the chaplet 18 and an upper surface 106 of the stem 24, with the tubular portion 42 of the actuator 12 and the stem 24, pass through the interior passage 53 of the elastic spring element. The lower opening 56 of the elastic spring element 16 is held within a groove 100 of the chaplet 18, while the upper opening 54 abuts the surface 106 of the stem 24. The elastic dome spring 16 functions as a compression spring. In the exemplary embodiment, the elastic dome spring is made from polyester elastomer. Other elastic materials are also suitable.

The hand pump 10 further includes a closure 20 which is disposed between the chaplet 18 and the pump body 30. The closure 20 will typically be equipped with internal threads 122 for attachment to a dispenser container with mating threads. Other means of attachment of the closure to the dispenser container, such as a snap fit or bayonet fit, are also suitable.

Operation of the All Plastic Hand Pump

With reference to FIGS. 1-4, the all plastic hand pump of the present invention 10 operates in keeping with the following four steps:

(1) On the first down stroke, the piston 26 lifts off the sub-stem 28, sliding upwardly on the stem 24, wherein the step 121 (see FIG. 10) of the stem 24 seals against an upper lip 123 (see FIG. 4) of the piston 26 and thereby allows air to enter the interior flow passage 76 of the stem 24 and escape through the interior flow passage 15 of the nozzle, via the interior flow passage 43 of the actuator 12, as the actuator 12 is depressed. Simultaneously, the check valve 58 located at the lower end 62 of the pump body 30 closes preventing fluid from entering the pump body 30.

(2) On the first up stroke, the piston 26 slides downwardly, relative to the stem 24, and seals against the sub-stem 28 preventing fluid from entering the interior flow passage 76 of the stem 24, and simultaneously, the check valve 58 opens due to a pressure differential creating suction that pulls fluid into the pump body 30.

(3) On the second down stroke the piston 26 again lifts off the sub-stem 28 and the step 121 of the stem 24 seals against the upper lip 123 (see FIG. 4) of the piston 26, allowing fluid to enter the interior flow passage 76 of the stem 24, while simultaneously the check valve 58 closes due to increased pressure in the pump body, causing fluid in the pump body 30 to be forced into the interior flow passage 76 of the stem 24 and out the interior flow passage 15 of the nozzle 14 via the interior flow passage 43 of the actuator 12 which connects the interior flow passage 76 of the stem with the interior flow passage 15 of the nozzle.

(4) On the second up stroke, the piston 26 again slides downwardly, relative to the stem 24 and seals against the sub-stein 28 thereby preventing fluid from entering the interior flow passage 76 of the stem 24, while simultaneously, the check valve 58 opens and a new charge of fluid is drawn into the pump body 30. Thereafter, steps (3) and (4) repeat for so long as the hand pump 10 is continuously operated.

With reference to FIGS. 1-4, 6-12 and 14-15, the hand pump 10 of the present invention also includes a pump locking feature which prevents operation of the pump, meaning depression of the actuator 12, when the hand pump 10 is in the locked condition. The locking feature comprises longitudinal ribs 112 which extend from the stem 24. The longitudinal ribs 112 slide within guide means in the chaplet 18 wherein the guide means comprises through-slots 114 formed in the chaplet 18. In the unlocked position, the stem 24 reciprocates within the chaplet during operation of the pump, where the stem 24 is located and guided via the longitudinal ribs 112 of the stem 24 and the through-slots 114 of the chaplet 18.

The hand pump 10 may be put in the locked position, when the hand pump 10 is at rest and the actuator 12 is in the up position. When the actuator 12 is in the up position, the stem 24 is near the end of its travel. In this position, the longitudinal ribs 112 of the stem 24 clear the through-slots 114 of the chaplet. When the longitudinal ribs 112 have cleared the through-slots 114, the stem 24 may be rotated clockwise. Clockwise rotation of the stein 24 causes a base 120 of the longitudinal ribs 112 to slide along a ledge 116 of the chaplet 18. As the longitudinal ribs 112 rotate clockwise, the base 120 slides off the ledge 116 and drop into shallow depth slots 118 formed in the chaplet 18, whereby further rotation is prevented. The shallow depth slots 118 prevent depression of the actuator 12 and consequently operation of the hand pump 10. To unlock the hand pump 10, the actuator 12 is rotated counter-clockwise which causes the longitudinal ribs 112 to rotate counter-clockwise and move up out of the shallow depth slots 118 and into the through-slots 114, whereby operation of the hand pump 10 may take place.

Venting of the All Plastic Hand Pump

With reference to FIGS. 1-4, 6-12, the all plastic hand pump 10 of the present invention is equipped with the at least one air vent 108 formed in the pump body 30 which allows air communication between the portion of the interior volume 32 of the pump body 30, above the level of the piston 26, and the interior volume 41 of the dispenser container 40. The all plastic hand pump 10 also includes the at least one air vent 110 formed in the stem 24 which allows air communication between that portion of the interior volume 32 of the pump body 30 above the level of the piston 26, and the atmosphere. It is necessary to equalize the pressure of the interior of the container to allow the hand pump 10 to properly operate.

The vent system of the all plastic hand pump 10 operates as follows: When the actuator 12 is pushed downwardly, the piston 26 moves downwardly, uncovering or opening the at least one vent 108 in the pump body 30. Due to a pressure differential between the atmosphere and the interior of the container 40, usually air will flow from the outside to the inside of the container as vacuum is created due to the displacement of the fluid. Outside air will flow through the at least one vent 110 formed in the stem 24 and will pass through the gap between the elastic dome spring 16 and enter the interior of the dispenser container 40 through the at least one vent 108 formed in the pump body 30, to equalize the pressure with the atmosphere. The at least one vent 110 is placed high on the stem 24 and under the actuator 12 to inhibit water intrusion due to splashing.

The component parts of the all plastic hand pump 10 will preferably be made from compatible, recyclable materials. Suitable materials include polypropylene and polyethylene. Both polypropylene and polyethylene can be recycled and both materials are from the polyolefin family. Because both materials are from the polyolefin family, they are compatible when reground together and recycled. Therefore, if the all plastic hand pump 10 of the present invention is made from one or both of these materials, there is no need to disassemble used pumps during recycling.

Although not essential for the hand pump to function properly, the check ball 60 of the check valve 58 is preferred to sink due to gravity to seal the valve opening when the hand pump 10 is at rest. Otherwise, the liquid in the pump body 30, when primed, may seep back into the dispenser container 40 and require the hand pump 10 to be primed again. Polyethylene and polypropylene both have a specific gravity of less than 1.0, which means that they will float in water and other liquids. Conventional pumps use glass or metal balls which have a high specific gravity. To keep the hand pump 10 of the present invention "all plastic," the check ball 60 is preferably made from POM (Acetal) which has a specific gravity of about 1.4, which makes the check ball 60 heavier than water and most liquids.

While the present invention has been described with regards to particular embodiments, it is recognized that additional variations of the present invention may be devised without departing from the inventive concept.

What is claimed is:

1. A hand operated dispensing pump made from all plastic materials, for dispensing fluid from a container, comprising:
    an actuator, a chaplet, a stem, a piston, a pump body, a check valve, and an elastic polymer spring;
    the actuator including a flow passage having an inlet and an outlet;
    the stem including a flow passage having an inlet and an outlet;
    the pump body formed as a hollow, cylindrical body, having an open upper end, a fluid inlet at a lower end, and an interior volume therebetween;
    the check valve formed integrally with the pump body and disposed at the lower end and above the fluid inlet of the pump body;
    the stem configured such that the piston is attached to the inlet of the stem;
    the piston configured to be slidable downwardly on the stem to close the inlet of the flow passage of the stem and configured to be slidable upwardly on the stem to open the inlet of the flow passage of the stem;
    the chaplet configured to be disposed within the open upper end of the pump body;
    the stem configured to be disposed via guide means within the chaplet;
    the piston configured to slidably engage an interior cylindrical wall of the pump body and seal against the interior wall of the pump body;
    the flow passage of the actuator configured to be in fluid communication with the flow passage of the stem, the flow passage of the stem configured to be in fluid communication with the interior volume of the pump body, the interior volume of the pump body configured to be in fluid communication with a product to be dispensed;
    the elastic polymer spring configured to drive the actuator to a rest position;
    wherein, upon a down-stroke of the actuator, the check valve closes the fluid inlet of the pump body and the piston slides upwardly and sealing on the stem opening the inlet of the flow passage of the stem; and
    wherein, upon an up-stroke of the actuator, the check valve opens the fluid inlet of the pump body and the piston slides downwardly on the stem closing the inlet of the flow passage of the stem.

2. The hand operated dispensing pump made from all plastic materials, for dispensing fluid from a container of claim 1, wherein the elastic polymer spring is cylindrical with a dome-shaped top.

3. The hand operated dispensing pump made from all plastic materials, for dispensing fluid from a container of claim 2, wherein a wall thickness of the dome-shaped elastic polymer spring tapers from a bottom of the spring to a top of the spring.

4. The hand operated dispensing pump made from all plastic materials, for dispensing fluid from a container of claim 1, further including at least one upper vent in air communication with a portion of the interior volume of the pump body above the piston.

5. The hand operated dispensing pump made from all plastic materials, for dispensing fluid from a container of claim 4, wherein the at least one upper vent is formed in the stem.

6. The hand operated dispensing pump made from all plastic materials, for dispensing fluid from a container of claim 1, further including at least one lower vent in the pump body in air communication with the interior of a dispenser container, wherein the lower vent is blocked by the piston when the piston is in a rest position and unblocked during a down-stroke of the piston.

7. The hand operated dispensing pump made from all plastic materials, for dispensing fluid from a container of claim 1, wherein the check valve is a ball type valve.

8. The hand operated dispensing pump made from all plastic materials, for dispensing fluid from a container of claim 1, wherein the check valve is a ball type valve made of plastic or metal impregnated plastic materials.

9. The hand operated dispensing pump made from all plastic materials, for dispensing fluid from a container of claim 1, further including a closure, wherein the closure attaches the dispensing pump to the container containing the fluid to be dispensed.

10. The hand operated dispensing pump made from all plastic materials, for dispensing fluid from a container of claim 1, wherein the dispensing pump is formed from a plurality of recyclable plastics.

11. A hand operated dispensing pump made from all plastic materials, for dispensing fluid from a container, comprising:

an actuator, a stem, a piston, a pump body, a check valve, and an elastic polymer spring;

the actuator including a flow passage having an inlet and an outlet;

the stem including a flow passage having an inlet and an outlet;

the pump body formed as a hollow, cylindrical body, having an upper end, a fluid inlet at a lower end, and an interior volume therebetween;

at least one upper vent in air communication with a portion of the interior volume of the pump body above the piston;

the check valve disposed between the interior volume and fluid inlet of the pump body;

the stem configured such that the piston is attached to the inlet of the stem;

the piston configured to open the inlet of the flow passage of the stem on a down-stroke of the actuator and configured to close the inlet of the flow passage of the stem on an upstroke;

the flow passage of the actuator configured to be in fluid communication with the flow passage of the stem, the flow passage of the stem configured to be in fluid communication with the interior volume of the pump body, the interior volume of the pump body configured to be in fluid communication with a product to be dispensed;

the elastic polymer spring configured to drive the actuator to a rest position;

wherein, upon a down-stroke of the actuator, the check valve closes the fluid inlet of the pump body and the piston opens the inlet of the flow passage of the stem; and wherein, upon an up-stroke of the actuator, the check valve opens the fluid inlet of the pump body and the piston closes the inlet of the flow passage of the stem.

12. The hand operated dispensing pump made from all plastic materials, for dispensing fluid from a container of claim 11, wherein the elastic polymer spring is dome-shaped.

13. The hand operated dispensing pump made from all plastic materials, for dispensing fluid from a container of claim 12, wherein a wall thickness of the dome-shaped elastic polymer spring tapers from a bottom of the spring to a top of the spring.

14. The hand operated dispensing pump made from all plastic materials, for dispensing fluid from a container of claim 11, wherein the at least one upper vent is formed in the stem.

15. The hand operated dispensing pump made from all plastic materials, for dispensing fluid from a container of claim 11, further including at least one lower vent in the pump body in air communication with the dispenser container, wherein the lower vent is blocked by the piston when the piston is in a rest position and unblocked during a down-stroke of the piston.

16. The hand operated dispensing pump made from all plastic materials, for dispensing fluid from a container of claim 11, wherein the check valve is a ball type valve.

17. The hand operated dispensing pump made from all plastic materials, for dispensing fluid from a container of claim 11, wherein the check valve is a ball type valve made of plastic or metal impregnated plastic materials.

18. The hand operated dispensing pump made from all plastic materials, for dispensing fluid from a container of claim 11, wherein the dispensing pump is formed from a plurality of recyclable plastics.

19. A hand operated dispensing pump made from all plastic materials, for dispensing fluid from a container, comprising:

an actuator, a stem, a piston, a pump body, a check valve, and an elastic polymer spring;

the actuator having a flow passage;

the pump body having an interior volume and an inlet;

at least one upper vent in air communication with a portion of the interior volume of the pump body above the piston;

the stem having a flow passage and being partially disposed within the interior volume of the pump body;

the piston being attached to the stem and configured to close the inlet of the flow passage of the stem on a down-stroke of the actuator and configured to open the inlet of the flow passage of the stem on an upstroke of the actuator;

the actuator being in fluid communication with the stem, the stem being in fluid communication with the interior volume of the pump body, the interior volume of the pump body configured to be in fluid communication with a product to be dispensed;

the check valve disposed between the interior volume and the inlet of the pump body;

wherein, upon a down-stroke of the actuator, the check valve closes the fluid inlet of the pump body and the piston opens the inlet of the flow passage of the stem;

wherein, upon an up-stroke of the actuator, the check valve opens the fluid inlet of the pump body and the piston closes the inlet of the flow passage of the stem;

wherein the elastic polymer spring is configured to drive the actuator on the up-stroke.

20. The hand operated dispensing pump made from all plastic materials, for dispensing fluid from a container of claim 19, wherein the elastic polymer spring is dome-shaped and, wherein the wall thickness of the dome-shaped elastic polymer spring tapers from a bottom of the spring to a top of the spring.

* * * * *